United States Patent
Sjöquist

(10) Patent No.: US 6,386,485 B1
(45) Date of Patent: May 14, 2002

(54) ARRANGEMENT AND METHOD FOR REGULATING THE STEERING FORCE IN A MECHANICAL STEERING SYSTEM FOR AN AIRCRAFT

(75) Inventor: Anders Sjöquist, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 09/554,886

(22) PCT Filed: Dec. 21, 1998

(86) PCT No.: PCT/SE98/02405

§ 371 Date: May 22, 2000

§ 102(e) Date: May 22, 2000

(87) PCT Pub. No.: WO99/36314

PCT Pub. Date: Jul. 22, 1999

(30) Foreign Application Priority Data

Dec. 30, 1997 (SE) .............................. 9704929

(51) Int. Cl.[7] .............................................. B64C 13/16
(52) U.S. Cl. ............................ 244/194; 701/4; 244/178
(58) Field of Search .............................. 244/76 R, 194, 244/195, 177, 178, 179; 701/4–9

(56) References Cited

U.S. PATENT DOCUMENTS

| | | | |
|---|---|---|---|
| 3,473,760 A | * 10/1969 | Vaiden ........................ | 244/236 |
| 3,733,039 A | * 5/1973 | O'Connor et al. .......... | 318/584 |
| 3,765,624 A | * 10/1973 | Kaniuka ..................... | 244/221 |
| 4,345,195 A | 8/1982 | Griffith et al. ............... | 318/628 |
| 5,107,080 A | * 4/1992 | Rosen ......................... | 200/6 A |
| 5,224,664 A | * 7/1993 | Adams, Sr. et al. ..... | 244/17.13 |
| 5,347,204 A | * 9/1994 | Gregory et al. ............. | 318/632 |
| 5,596,499 A | * 1/1997 | Glusman et al. .............. | 701/14 |
| 5,694,014 A | * 12/1997 | Hegg et al. .................. | 318/584 |
| 5,913,492 A | * 6/1999 | Durandeau et al. ......... | 244/228 |

FOREIGN PATENT DOCUMENTS

| | | | |
|---|---|---|---|
| GB | 1326525 | 8/1973 | ........... B64C/13/04 |

* cited by examiner

*Primary Examiner*—Galen L. Barefoot
(74) *Attorney, Agent, or Firm*—Swidler Berlin Shereff Friedman, LLP

(57) ABSTRACT

The present invention relates to an arrangement and a method in a mechanical control system of an aircraft. From the cockpit of the aircraft control surfaces (1) of the aircraft can be acted upon via the control system by means of at least one control element (3), for example a wheel, a control column or a pair of pedals operatively connected to the control system. A servomotor (5) together with sensors is also connected to the control system. The sensors are designed, when acted upon by the control element (3), to detect the torque exerted on the control element (3) by a force applied thereto, the trim angle of the control element and the angular velocity with which the action occurs. The arrangement comprises a control device (9) which, on the basis of the conditions detected by the sensors, is designed to control the servomotor (5) so that a ratio between the force applied to the control element (3) and the trim angle of the control element assumes a desired, essentially constant value.

18 Claims, 2 Drawing Sheets

Figure 1:
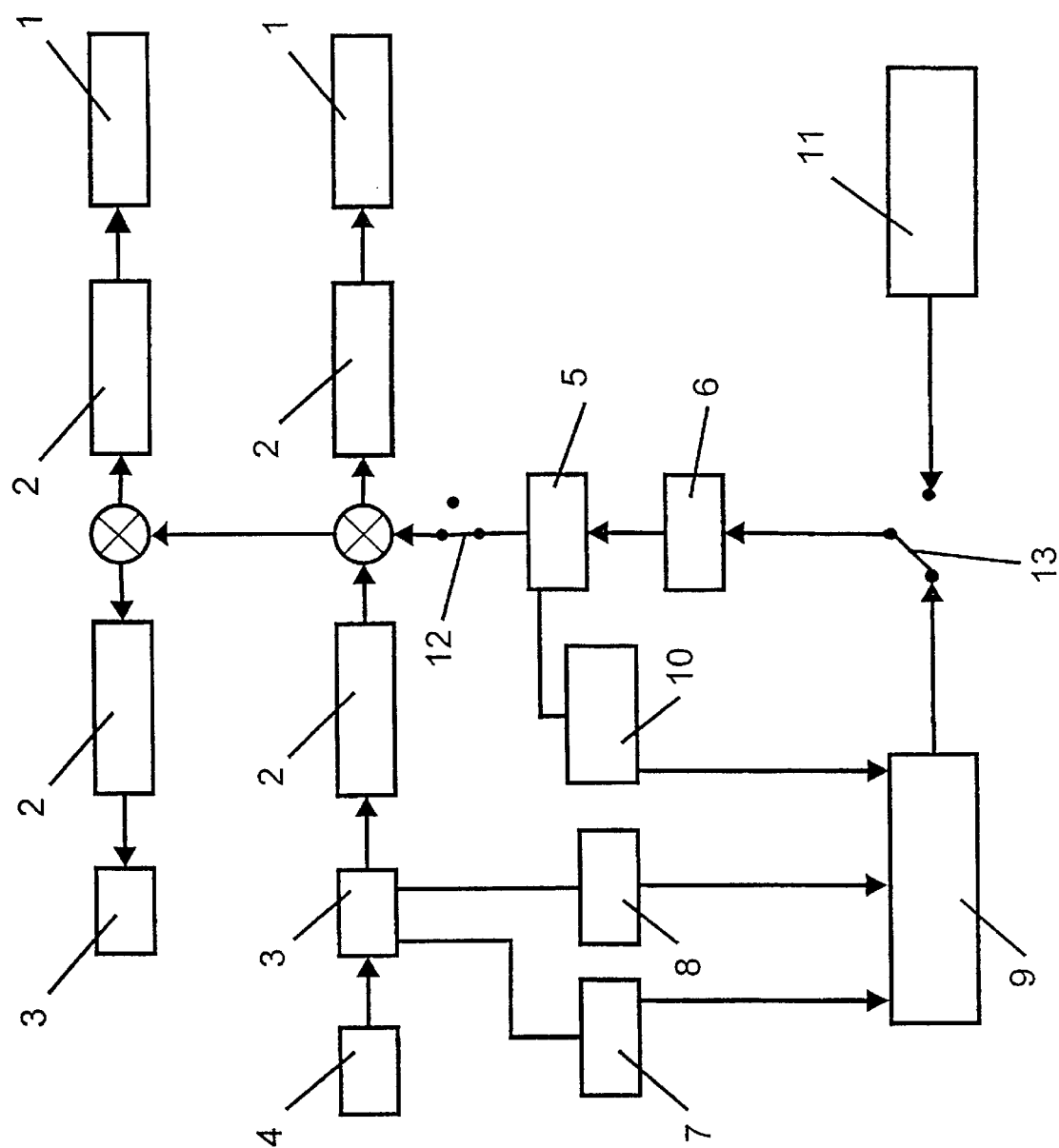

ARRANGEMENT AND METHOD FOR REGULATING THE STEERING FORCE IN A MECHANICAL STEERING SYSTEM FOR AN AIRCRAFT

The present invention relates to an arrangement in a mechanical control system of an aircraft, in which control surfaces of the aircraft can be acted upon from the cockpit of the aircraft via the control system by means of at least one control element operatively connected to the control system, for example by means of a wheel, a control column or a pair of pedals, as specified in the pre-characterising clause of claim 1.

The invention furthermore relates to a method of regulating the force which, in order to achieve a desired trim angle, must be applied to a control element for controlling an aircraft's control surfaces, the said control element being operatively connected to a mechanical control system and comprising, for example, a wheel, a control column or a pair of pedals, as specified in the pre-characterising clause of claim 6.

Providing smaller and medium-sized aircraft with mechanical control systems in which, in manual flying, only the muscle power of the pilot acts on the control surface via cables and steering system, is already known. The aim in this case is to design the control surfaces so that the aerodynamic and mechanical forces acting on the control surfaces in flight do not become so great that it becomes difficult for the pilot to alter the control surfaces position. Some common, known solutions involve the use of various types of auxiliary control surfaces, so-called tabs, in combination with aerodynamic balancing of the control surfaces in order to achieve manageable levels of force.

With the known solutions, however, problems still remain. For example, it may be difficult to optimise the dynamic connection between torque applied and column/wheel position and it may, in particular, be difficult for a pilot to act upon the control surfaces in a critical situation, for example when the stability is suddenly lost in a roll-trimmed position and the aircraft, as a result of this, rolls strongly in either direction, which can occur as a result of heavy icing.

One object of the present invention is to produce an arrangement of the type initially referred to, which gives the pilot servo-assistance in manual flying. The object is achieved by an arrangement having the characteristics specified in claim 1.

A further object of the present invention is to produce a method of the type initially referred to, by means of which servo-assistance is obtained in manual flying. The object is achieved by a method having the characteristics specified in claim 6.

Preferred embodiments of the arrangement also have any or some of the characteristics specified in the subordinate claims.

The arrangement according to the invention has several advantages:

By means of this arrangement a linear power gradient can be obtained. A desired value can be assigned to the static power gradient. Desired values can be assigned to viscous damping and friction of the wheel. A desired magnitude can be assigned to the influence of the mass of the system on the control column/the wheel.

The positional feedback also offers the advantage that it is possible to influence the eigenfrequency of the system, so that this is not simply determined by the external load and moment of inertia of the system. Without positional feedback it is not possible to linearise any non-linear force in the basic mechanical system. Positional feedback means that a linear correlation can be obtained between the torque applied to the control column/the wheel and the trim angle.

Figure 2:
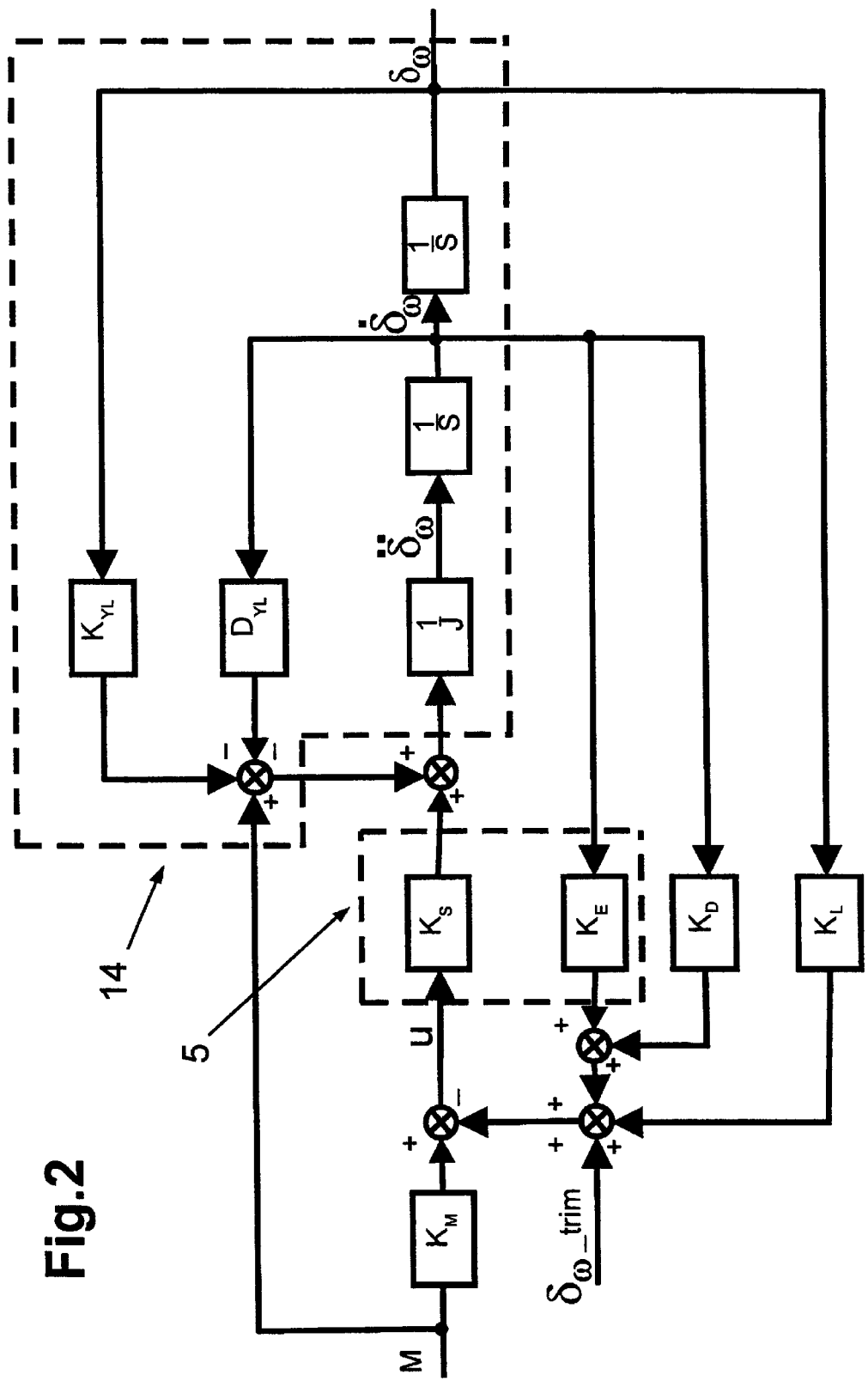

The invention will be explained in more detail below with the aid of an example of embodiments of the present invention and with reference to the attached drawings in which:

FIG. 1 shows a simplified general diagram of a servo-assisted control surface system according to the invention FIG. 2 shows a simplified control technology description of the servo-assisted control surface system In describing all figures the same reference designations are used for identical or similar parts.

The simplified general diagram shown in FIG. 1 shows an aileron system, which on each wing comprises an aileron 1, which is connected by means of aileron cables 2 to a control element 3, in the form, for example, of a wheel. The aileron system comprises two control elements 3, one of which is acted upon manually by the pilot 4 when in flight. Somewhere along the aileron cables 2 there is a servomotor 5, which by means of a first change-over switch 12 can either be connected up (as shown) or alternatively disengaged. A servo-driver 6 is connected to the servomotor 5. Both a torque sensor 7 and an angle transmitter 8, which supply information to a control device 9, which also receives information from an angular velocity sensor 10 on the servomotor 5, are arranged at each control element 3 (shown only for one control element). Alternatively the angle transmitter 8 can be located on the servomotor 5 and/or the angular velocity sensor 10 at the control element. From this information the control device 9 generates a control signal for the desired influencing of the servomotor 5, the latter being designed to regulate the torque that the pilot 4 has to apply to the control element 3 so that the ratio between the torque applied and the trim angle of the control element assumes a desired, largely constant value irrespective of the trim angle of the control element. The servomotor 5 can thus work with and against the torque applied by the pilot 4. It will be seen from the figure that the servomotor may be the same as that used when flying with an automatic control/autopilot 11 and a second change-over switch 13 allows a choice between manual or autopilot control.

FIG. 2 shows a simplified control technology description of a servo-assisted aileron system according to FIG. 1, in which the reference number 14 denotes the mechanical aileron system and the reference number 5 denotes the servomotor. In the figure the torque that occurs on the control element as a result of the force applied by the pilot is denoted by M. The wheel angular position, which in the main is proportional to the control surface angular position, is here represented by the feedback signal $\delta_\omega$ and the wheel angular velocity by $\dot{\delta}_\omega$. J denotes the moment of inertia of the entire mechanical aileron system 14 transmitted to the wheel. In FIG. 2 the aileron system 14 is represented by a system of the second order with a spring constant $K_{YL}$ and a damping $D_{YL}$, in which the spring constant $K_{YL}$ and the damping $D_{YL}$ relate to the control surface shaft torque and both are relative to the wheel. A wheel angle acceleration is denoted as $\ddot{\delta}_\omega$.

The servomotor 5 has a gain $K_S$ and emf-constant $K_E$, which are proportional to the angular velocity $\dot{\delta}_\omega$. In order to eliminate the effect of the servomotor's counter-emf and in order to compensate for variations in the resistance of the motor due, for example, to temperature fluctuations, a current-controlled motor is normally used. The servo-assisted aileron system also has closed-loop gains $K_M$, $K_L$ and $K_D$, where $K_M$ represents a gain of the torque signal M, $K_L$ represents a gain of the feedback signal $\delta_\omega$ and $K_D$ represents a gain of the signal $\dot{\delta}_\omega$. The values of the closed-loop gains are calculated beforehand from the desired values of the spring constant $k_f$, eigen frequency $\omega_0$ and relative damping z of the entire servo-assisted aileron system, measured on the wheel, where $$k_f = \frac{K_L K_S + K_{YL}}{K_M K_S + 1}$$

$$\omega_0 = \sqrt{\frac{K_L K_S + K_{YL}}{J}}$$

$$z = \frac{K_S(K_E + K_D) + D_{YL}}{2\sqrt{(K_L K_S + K_{YL})J}}$$

From these equations the closed-loop gains $K_M$, $K_L$ and $K_D$ are obtained as:

$$K_L = \frac{J\omega_0^2 - K_{YL}}{K_S}$$

$$K_M = \frac{K_L}{K_f} + \frac{1}{K_S}\left(\frac{K_{YL}}{k_f} - 1\right)$$

$$K_D = \frac{2zJ\omega_0 - K_E K_S - D_{YL}}{K_S}$$

The control signal u to the servomotor is thus described by the equation:

$$u = K_M M - (K_L \delta_\omega + (K_D + K_E)\dot{\delta}_\omega + \delta_{\omega\_trim})$$

the signal $\delta_{\omega\_trim}$ being described in more detail later.

In order to arrive at a simple description of the system it has been assumed that the mechanical aileron system 14 can be treated as a linear system of the second order. In reality the aileron system 14 is considerably more complex. In particular there is significant friction and play, which together with the elasticity in the control surface cables 2 contributes to the occurrence of local resonances with local frequencies. These characteristics limit the scope for free selection of the closed-loop gains $K_M$, $K_L$ and $K_D$ and hence also of the dynamic characteristics, that is free selection of $k_f$, $\omega_0$ and z.

Furthermore the signals M, $\delta_\omega$ and $\dot{\delta}_\omega$, which form input signals to the mechanical aileron system 14 through the servomotor 5, ought to be filtered so that their frequency interval and amplitude are such that the approximation of the aileron system as a linear system of the second order is valid. In order to achieve this all input signals M, $\delta_\omega$ and $\dot{\delta}\omega$, have been low-pass filtered. In one example the cut-off frequency of the filter which filters the wheel angle signal $\delta_\omega$ and the wheel angular velocity signal $\dot{\delta}_\omega$ is 50 Hz, whilst the cut-off frequency for the filter that filters the torque signal is 15 Hz. For reasons of strength, it is advisable to filter the torque signal M through a filter designed, at high torque signal values, to produce an output signal that decreases as the torque signal increases. It is also advisable to filter the torque signal M through a filter with a dead zone, in which the torque signal is close to zero in order to produce a torque threshold, which must be surmounted before the influence on the servomotor 5 occurs. It is also advantageous to filter the torque signal through a phase-advanced filter. In one example the amplitude of the wheel angular velocity signal $\dot{\delta}_\omega$ is limited by a limiter at high angular velocities.

The servomotor 5 functions more or less linearly. Maximum torque is obtained when the angular velocity is zero and the torque is decreasing linearly with increasing revolutions.

The ailerons 1 on most aircraft with purely mechanical control systems have so-called trimming tabs, the position of which is adjusted by means of so-called trimming jacks. Normally only the trimming system on one wing is used, for example the left wing, whilst the trimming system on the other wing constitutes a reserve system. The trimming system functions so that in trimming the trimming jack acts on the angle of the trimming tab, the aileron 1 being turned out by a certain angle. In the mechanical system this will mean that the zero position of the wheel, that is the trimming position that the wheel assumes when the torque applied by the pilot 4 is zero, will be adjusted.

When trimming, problems might occur with a servo-assisted system if no compensation is made for the new zero position. This problem can be eliminated by applying an angular adjustment term $\delta_{\omega\_trim}$, corresponding to the trimmed zero position of the wheel, to the wheel angle feedback signal. The angular adjustment term can be created from signals from position sensors located on the trimming jacks. Allowance must be made, however, for the fact that the efficiency of the trimming tab is greater when moving downward from a neutral position into the high pressure under the wing, than when moving upwards into the low pressure on the upper side of the wing. If the trimming jack position sensor is arranged so that the signal from this is positive when the trimming tab moves downwards and negative when the tab moves upwards, allowance must also be made for this. Allowance must also be made, depending on whether just the ordinary trimming system is used, the reserve trimming system or a combination of these.

It will be obvious to a person skilled in the art that the invention is not confined to the embodiments described above but rather lends itself to modifications within the framework of the idea of the invention defined in the following claims. The arrangement may, for example, be constructed so that an autopilot servo located in the control system is used and/or so that the ratio between the force applied to the control element and the trim angle of the control element is increased as the aircraft speed increases, and vice versa, in order thereby to give the pilot a natural sensation of speed in the control surfaces. The system can furthermore naturally also be used on elevators and rudders.

What is claimed is:

1. A system for mechanical control of an aircraft, the system comprising:
   control surfaces operable to steer the aircraft;
   at least one control element operable to act upon the control surfaces from a cockpit of the aircraft;
   a servomotor operably connected to the at least one control element and first sensors, the servomotor and first sensors operable when acted upon by the at least one control element to detect a torque exerted on the at least one control element, a trim angle of the at least one control element, and an instantaneous angular velocity of the at least one control element; and
   a control device operable to control the servomotor such that a ratio between a force applied to the at least one control element and the trim angle of the at least one control element is substantially constant.

2. The system according to claim 1, wherein the control surfaces comprise ailerons.

3. The system according to claim 1, wherein the at least one control element comprises a wheel, a control column, or a pair of pedals.

4. The system according to claim 1, further comprising:
   an autopilot operably connected to and interacting with the servomotor.

5. The system according to claim 1, wherein the control surfaces comprise trimming tabs operable to trim roll and trimming jacks operable to act on the trimming tabs, the system further comprising:

second sensors operable to detect a position of the trimming jacks, wherein the at least one control device based upon positions detected by the second sensors is operable to define a trim position that the at least one control element has been made to assume as a median position for the at least one control element in an unaffected position where no gain is received from the servomotor.

6. The system according to claim 1, further comprising:

a filter operable to filter out local resonances on a basis of conditions detected by the first sensors.

7. The system according to claim 1, further comprising:

speed sensors for detecting a speed of the aircraft, wherein based upon the detected speed the system increases the ratio between the force applied to the control element and the trim angle of the control element as the speed of the aircraft increases and decreases the ratio between the force applied to the control element and the trim angle of the control element as the speed of the aircraft decreases.

8. A system for mechanically controlling an aircraft in which the aircraft comprises control surfaces operable to steer the aircraft and at least one control element operable to act upon the control surfaces from a cockpit of the aircraft, the system comprising:

a servomotor and sensors operably connected to the at least one control element and operable when acted upon by the at least one control element to detect a torque exerted on the at least one control element, to detect a trim angle of the at least one control element, and to detect an instantaneous angular velocity of the at least one control element; and a control device operable to control the servomotor such that a ratio between a force applied to the at least one control element and the trim angle of the at least one control element is substantially constant.

9. A method for regulating a force applied to a control element of a mechanical system for controlling control surfaces of an aircraft to produce a desired trim angle, the method comprising:

detecting a force applied to a control element;

detecting a trim angle of the control element; and based upon the detected conditions controlling a servomotor operably connected to the control element to achieve a desired substantially constant ratio between force applied to the control element and a trim angle of the control element.

10. The method according to claim 9, further comprising:

detecting an instantaneous velocity of the control element.

11. The method according to claim 9, wherein the force is applied to the control element through a torque applied to the control element.

12. The method according to claim 9, wherein the control element is operably connected to a mechanical control system and comprises a wheel, a control column, or a pair of petals.

13. The method according to claim 9, wherein the servomotor is operably connected to an autopilot system.

14. The method according to claim 9, wherein the control surfaces comprise trimming tabs operable to trim roll and trimming jacks operable to act on the trimming tabs, the method further comprising:

detecting a position of the trimming jacks; and defining a median trim position for the control element in an unaffected state, wherein the median trim position is defined based upon a trim position that the control element is made to assume due to roll trimming, and wherein in the median trim position the servomotor does not amplify an input signal to the control system.

15. The method according to claim 9, further comprising:

filtering out local resonances in the mechanical control system.

16. The method according to claim 15, wherein the local resonances are filtered based upon the detected force and the detected trim angle.

17. The method according to claim 9, further comprising:

detecting a speed of the aircraft;

increasing the ratio between the force applied to the control element and the trim angle of the control element as the speed of the aircraft increases; and decreasing the ratio between the force applied to the control element and the trim angle of the control element as the speed of the aircraft decreases.

18. The method according to claim 9, wherein the control surfaces comprise ailerons.

* * * * *